Figure 1:
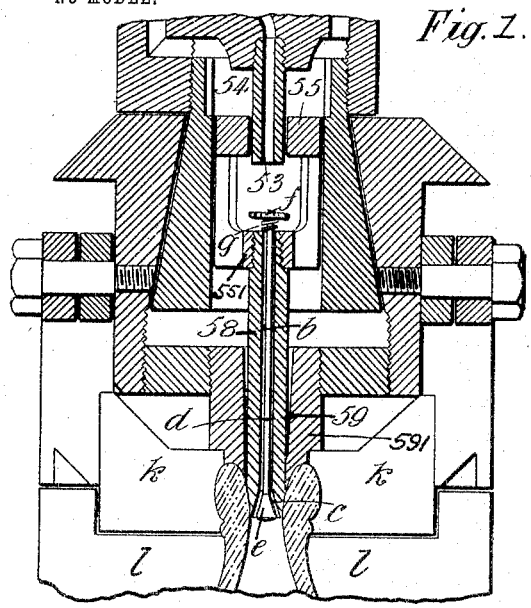

No. 777,261. PATENTED DEC. 13, 1904.
C. LEISTNER.
MACHINE FOR MANUFACTURING GLASS BOTTLES OR OTHER VESSELS.
APPLICATION FILED JULY 7, 1902.
NO MODEL.

WITNESSES:—
Ellis Owen

INVENTOR:—
Carl Leistner

No. 777,261. Patented December 13, 1904.

UNITED STATES PATENT OFFICE.

CARL LEISTNER, OF LONDON, ENGLAND.

MACHINE FOR MANUFACTURING GLASS BOTTLES OR OTHER VESSELS.

SPECIFICATION forming part of Letters Patent No. 777,261, dated December 13, 1904.

Application filed July 7, 1902. Serial No. 114,614. (No model.)

*To all whom it may concern:*

Be it known that I, CARL LEISTNER, a subject of the German Emperor, residing at 100 The Avenue, Bruce Grove, Tottenham, London, England, have invented certain new and useful Improvements in Machines for Manufacturing Glass Bottles or other Vessels, of which the following is a specification.

This invention relates to machines for the manufacture of glass bottles and the like, and has for its object to effect a more regular distribution of the glass in the formation of the bottle and to produce the necks of the bottles with corking-mouths or with mouths provided with internal screws or of other irregular shape.

Hitherto it has been difficult to produce in glass-blowing machines bottles with narrow necks in which the neck of the bottle was in any way profiled in the mouth or in the bore of the neck—that is, for example, provided with an internal screw for screwing in a stopper or provided with a shoulder for the reception of a cork ring. It has, furthermore, been difficult by the use of plungers employed hitherto to form a corking-mouth—that is, to shape the mouth of the bottle-neck in such a manner that a slightly-conical opening is formed which widens out again and by which the cork may be nipped when pressed into its position.

Nearly all glass-bottle-blowing machines hitherto in use for producing bottles with narrow necks have shaped the neck with a cylindrical bore by pressing the plunger into the mass of glass and withdrawing it again. In such machines which form the hollowing by blowing in air a hollow mouth is formed, such as indicated in dotted lines in Figure 2, which it is impossible to properly cork.

The chief object of the invention is to conveniently produce such bottles in glass-bottle-blowing machines.

According to the invention the plunger by means of which the cavity in the neck of the parison is formed is provided hollow and carries a stem at the front end of which a conical valve is provided, which in the absence of air-pressure normally rests on a corresponding conical seat in the plunger and is maintained in that position by the slight pressure of a spiral spring which is carried at the opposite extremity of the stem and is retained in position between a nut screwed onto the end of the valve-stem and the rear end of the plunger. Where a bottle having a contracted bore is to be produced for use with corks, the front end of the plunger is tapered, so as thus to form in the mouth of the neck an outwardly-flaring cone. The tubular plunger or core may, however, have its extremity provided of any other form, such as is desired to give to the mouth of the neck.

The invention is illustrated in the accompanying drawings, in which—

Figure 3:
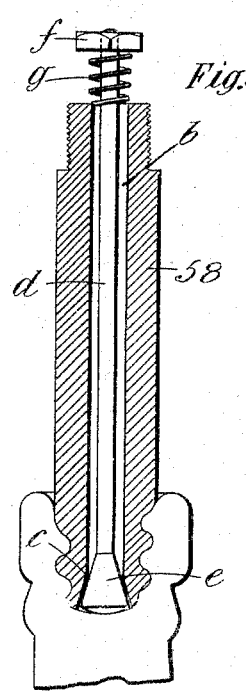
Figure 4:
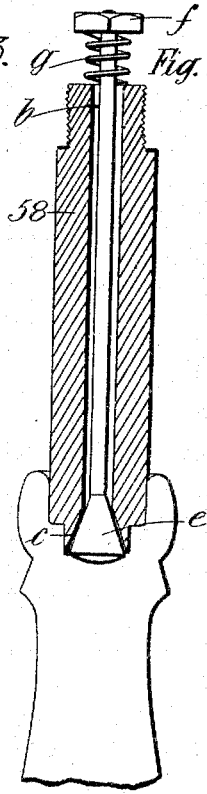
Figure 2:
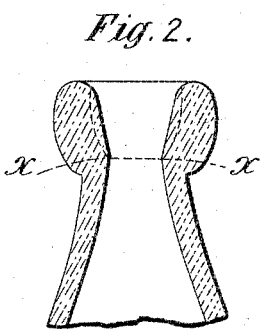
Figure 5:
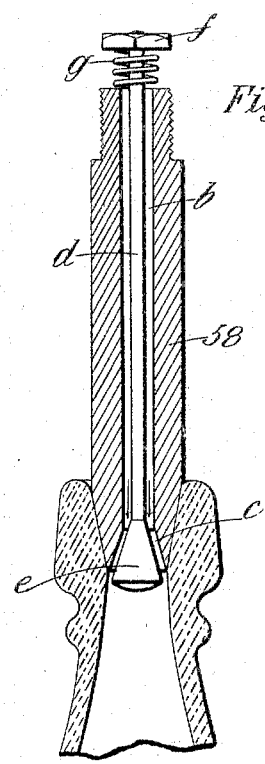

Fig. 1 is a transverse section of a plunger provided according to the invention and mounted within a neck-mold of the construction described in the specification of the Patent No. 704,055, dated July 8, 1902. Fig. 2 is a detail sectional elevation of the neck of a bottle as produced by the plunger illustrated in Fig. 1. Fig. 3 is a further sectional elevation, on an enlarged scale, of a plunger as provided for use in the formation of screwed mouths in the bottle-neck. Fig. 4 is an enlarged sectional elevation of the plunger as provided for the formation of a shoulder in the mouth of the bottle-neck for the reception, for example, of a cork ring. Fig. 5 is an enlarged sectional elevation showing the operation of the plunger, Fig. 1.

In carrying the invention into effect, as illustrated in Figs. 1, 2, and 5, in the production of a bottle provided with a corking-mouth or a contracted bore of the form required to nip a cork I provide the plunger 58 with a central bore $b$, through which passes the valve-stem $d$, carrying at its front extremity a conical valve $e$, which normally and in the absence of air-pressure rests within an outwardly-flaring conical seat $c$ at the front end of the plunger. The valve is maintained in its seated position by the slight pressure of a spring $g$, which is mounted at the opposite end of the plunger and abuts between a nut $f$, fixed on the extremity of the valve-stem $d$, and the rear end of the plunger.

In the production of bottles with a plunger (illustrated in Figs. 1, 2, and 5) the plunger 58 has its extremity preferably tapered on the exterior, so as thus to form the mouth of the bottle conical and outwardly flaring up to a certain limit, as indicated at $x$, Fig. 2, where the cork after its introduction into the neck would be nipped.

In Fig. 1 the plunger 58 is shown connected to the boss 551, carried by the piston 55, which piston slides within the cylinder 54. A tube 53 passes through a central hole within the piston 55 and serves for the passage of air, by means of which the piston 55 and the plunger 58 are retracted from the neck-ring or nipple 591 in order to permit of air passing through the conical bore 59 of the neck-ring or nipple 591 for blowing the parison. The neck-molds in which the neck of the bottle is formed are indicated by the reference-letters $k$ $k$, while the finishing-molds are indicated by the reference-letters $l$ $l$.

Fig. 1 represents the lower part of Fig. 5 of the drawings accompanying the specification of the Patent No. 704,055, dated July 8, 1902; but the invention is of general application to other machines than that covered in the aforesaid application.

In the blowing of the parison it will be understood that by the operation of the plug-cock (which is not shown in the drawings) air is admitted through the tube 53, whereby the conical valve $e$ is forced from its seat, and the air first issues through the annular space thus formed and has an outward direction given to it, by means of which the initial blowing, which offers the greatest resistance, is effectively performed. By such means the neck at the outset is cast and well formed with a contracted bore, and it is impossible for it to be subsequently deformed in the sense indicated in dotted lines in Fig. 2. When thus the neck is completely formed, the plunger 58 is then immediately withdrawn by the pressure of air on the piston 55, and the further blowing is effected by the admission of air through the conical bore 59 of the neck-ring or nipple 591. The front extremity of the plunger may be provided of any particular form required to produce a corresponding form of the mouth of the neck. For example, the end of the plunger may be formed with a screw, as illustrated in Fig. 3, to cast a corresponding screw within the mouth of the neck for the use of screwed stoppers, and in such a case means are provided for unscrewing the plunger or bottle, which means may conveniently consist in arranging that the piston 55 in its rearward movement shall rotate in a spiral path by means of a thread or threads provided on the wall of the cylinder 54 and engaging in the piston 55. In such a case the drawing out of the plunger is facilitated if the screw-threads are somewhat tapered toward the front end, or the plunger 58 might have its upper extremity provided with a circumferential series of teeth or with a toothed wheel gearing with a toothed rack transversely disposed to it and mounted within the wall of the cylinder 54, in which the piston 55 works.

Instead of rotating the plunger when forming screwed mouths in the necks of bottles means might be provided for the same purpose involving the rotation of the bottom mold.

The tension of the spring $g$ may be so adjusted that the whole bottle is blown through the bore $b$ of the plunger 58 and the latter is drawn back by the piston 55 when the bottle is completely blown; but I have found that the best results are obtained by finishing the blowing as I have hereinbefore described.

What I claim as my invention, and desire to secure by Letters Patent, is—

1. In a machine for manufacturing glass bottles, a hollow plunger, means for initially admitting air through the plunger for commencing the blowing of the parison, and means for withdrawing the plunger and for admitting air through the neck-ring for the final blowing to be performed.

2. In a machine for manufacturing glass bottles, a neck-mold, a hollow plunger, means for admitting air through the plunger, means for withdrawing the plunger, and means for admitting air through the space surrounding plunger, substantially as described.

3. In a machine for manufacturing glass bottles, a hollow plunger for forming the mouth of the neck, a piston to which said plunger is connected, a cylinder within which said piston freely slides, means for admitting air through the hollow plunger, and a neck-ring having a conical bore, substantially as described.

4. In a machine for manufacturing glass bottles, a neck-mold, a neck-ring having a conical bore, a hollow plunger for forming the mouth of the neck, a piston to which said plunger is connected, a cylinder within which said piston freely slides, an axial valve within said plunger, and means for admitting air under pressure between the valve and plunger.

5. In a machine for manufacturing glass bottles, a neck-mold, a neck-ring having a conical bore, a hollow plunger for forming the mouth of the neck, a piston to which said plunger is connected, a cylinder within which said piston freely slides, a conical axial valve opening outwardly for the admission of air through the neck of the bottle, a spring upon the rear extremity of the valve-stem for normally effecting the closure of the valve at the front end of the plunger, and means for admitting air under pressure between the valve and plunger.

In testimony whereof I have signed my name to this specification in the presence of two subscribing witnesses.

CARL LEISTNER.

Witnesses:
WILLIAM EDWARD EVANS,
FREDOLIN FREI.